June 30, 1970 H. R. CAMENZIND 3,518,458

DECOUPLING MEANS FOR INTEGRATED CIRCUIT

Filed June 23, 1967

INVENTOR.
HANS R. CAMENZIND
BY Robert [signature]
ATTORNEY

United States Patent Office 3,518,458

Patented June 30, 1970

3,518,458

DECOUPLING MEANS FOR INTEGRATED CIRCUIT

Hans R. Camenzind, Lexington, Mass., assignor to P. R. Mallory & Co. Inc., Indianapolis, Ind., a corporation of Delaware Filed June 23, 1967, Ser. No. 648,321
Int. Cl. H03k *1/12;* H03f *3/04*
U.S. Cl. 307—297 4 Claims

ABSTRACT OF THE DISCLOSURE

Interstage coupling through the power supply of a multistage transistor circuit is prevented by placing a plurality of transistors between the power supply and the individual stages. The bases of these transistors are biased at a constant potential in order to present a constant voltage at the emitters of the transistors. A multiple-emitter transistor may be used in place of the plurality of transistors.

The present invention concerns transistor circuits, and more particularly a power-supply decoupling and regulation means for use in a transistor or integrated circuit. In multi-stage transistor circuits, inter-stage coupling may occur through the power supply unless a very low impedance supply is used. That is, the current drawn by one stage may affect the supply voltage; this voltage change is then transmitted to another stage, where it is amplified and fed back to the first stage. For an odd number of stages, or at frequencies where the transistor phase shift exceeds 180°, this coupling produces unstable operation or oscillation of the circuit. Additionally, changes in the supply voltage of an individual stage occurring with changes in the applied signal can lead to nonlinearity and distortion of the output signal. Decoupling and some amount of regulation are commonly achieved by the use of large capacitors in the power leads to each stage or to small groups of stages. Isolation resistors may also be placed between the capacitors. The capacitors required for this application are, however, usually large in physical size and relatively expensive. Their size alone will almost always preclude their use in integrated circuits.

The present invention overcomes these limitations by providing, as a primary object, a decoupling and regulation means for a transistor circuit, including a plurality of transistor means having collectors, bases and emitters, each of the emitters being connected to a point within the transistor circuit, a power source connected to the collectors, and a source of constant potential connected to the bases. The decoupling and regulation means may alternatively include a single transistor means having a collector coupled to the power source, a base tied to the constant-potential source, and multiple emitters, each of which is connected to a point within the circuit.

Another object of the invention is to provide a decoupling and regulation means suitable for use in an integrated circuit because of the absence of large capacitors therein and because of its small size.

A further object of the invention is to provide a decoupling and regulation means which is simple and inexpensive to produce.

Still further objects and advantages of the invention, as well as modifications obvious to one skilled in the applicable arts, will become apparent from the following description of preferred embodiments, taken in conjunction with the accompanying drawing, in which.

Figures 1, 2:
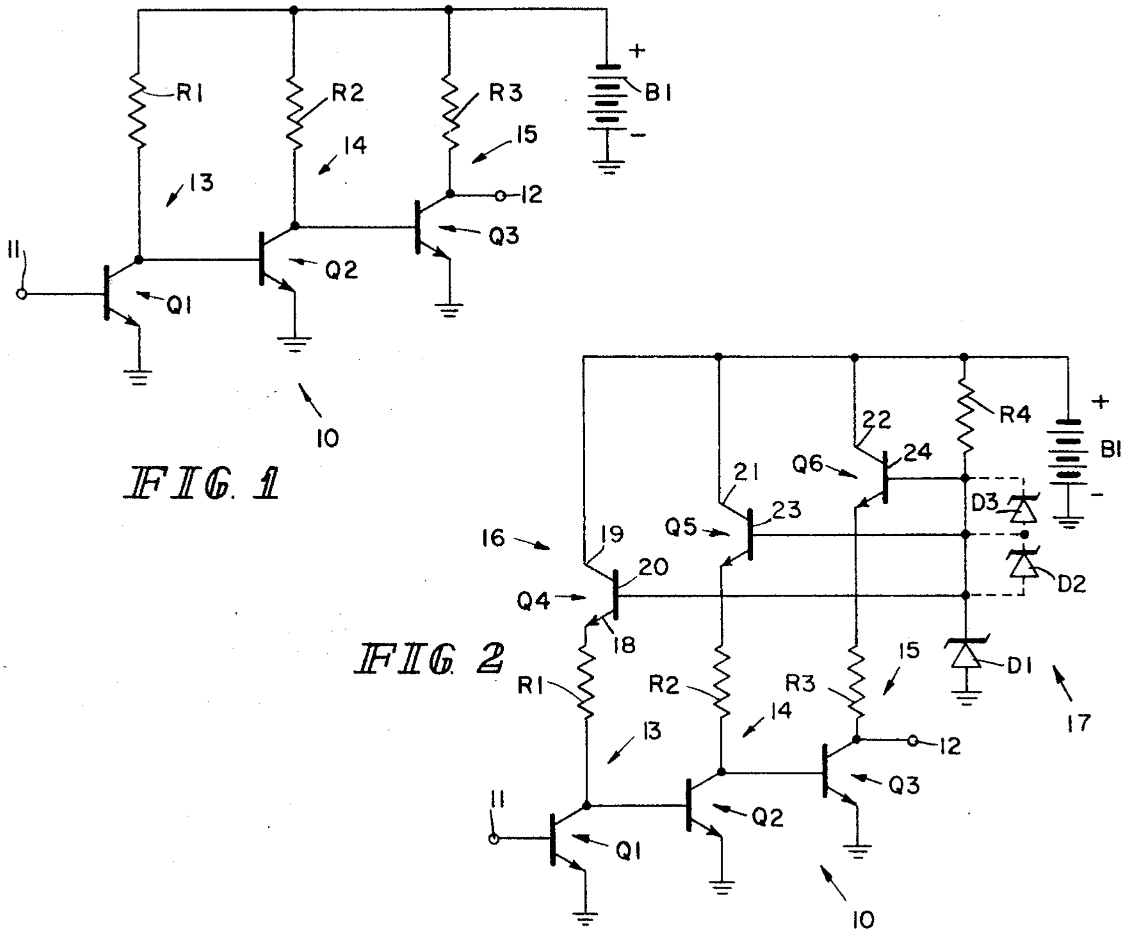
FIG. 1 is a schematic diagram of a multi-stage transistor amplifier.
FIG. 2 is a diagram of a first decoupling and regulation means according to the invention for use with the amplifier of FIG. 1.

Referring more particularly to the drawing, FIG. 1 illustrates a simplified form of a transistor circuit or amplifier 10 having an input terminal 11 and an output terminal 12. A transistor Q1 and a biasing resistor R1 comprise a first stage 13; transistor Q2 and resistor R2 comprise a second stage 14; and transistor Q3 and resistor R3 comprise a third stage 15. The resistors R1, R2 and R3 are connected to a power source or battery B1 which supplies power to all three stages 13, 14 and 15. If, because of an internal impedance, the voltage of B1 varies with the current drawn from it, then a heavy current drawn by Q3, for instance, will lower the voltage of B1 and thereby change the bias on Q1 and Q2. Therefore, assuming negligible phase shift in the amplifier 10, the signal at the output 12 will be fed back to Q1 through R1 to reinforce the signal at the stage 13, which is then further amplified by Q2 and Q3 to produce an even larger signal at the output 12, causing an even greater feedback to Q1. The direct result of this process is instability or oscillation in the amplifier 10.

If the collector of a transistor is connected to a power source and its base is biased at a constant potential, the voltage at its emitter is constant within a wide range of current flowing between the collector and emitter of the transistor. Furthermore, a transistor has a considerable current gain, so that the current drawn to its base from the constant-potential source is much less than the collector-emitter current of the transistor. And a constant potential is easily obtainable from an unregulated source if the current drawn at constant potential is small or relatively steady.

FIG. 2 illustrates the amplifier 10 and the unregulated power source B1 in conjunction with a decoupling and regulation means 16 comprising a plurality of transistor means Q4, Q5 and Q6 and a source 17 of constant potential. The source 17 comprises a dropping resistor R4 and a Zener diode D1. The characteristics of the diode D1 are such that a constant potential appears thereacross within the wide range of fairly small currents therethrough. Thus D1 may be connected to the unregulated supply B1 by a dropping resistor R4 which provides a varying voltage difference between the varying potential of B1 and the constant potential of D1.

In accordance with the aforementioned principles, the voltage at the emitter 18 of Q4 will be constant over a wide range of currents drawn through the collector 19 when the base 20 is connected to the source 17 of constant potential. In this way, the stage 13 is effectively isolated from power supply variations caused by the stages 14 or 15 or from other causes. The supply voltages of the stages 14 and 15 are similarly isolated and regulated by the transistors Q5 and Q6 respectively. Thus it will be seen that the supply voltage of each stage 13, 14 and 15 is stabilized against changes due to external causes, such as, for instance, battery voltage changes due to aging of the battery B1, by one of the transistors Q4, Q5 and Q6. Furthermore, each stage is protected against supply voltage changes from variations due to current drawn by another stage by two of these transistors; that is, both the stage attempting to cause a variation and the stage to be protected are regulated by a transistor Q4, Q5 or Q6, so that a twofold reduction in interstage coupling is achieved. The voltages on the bases 20, 23 and 24 are of course identical, since these bases are connected together to the Zener diode D1. If however, different potentials are desired for each stage, additional Zener diodes D2 and D3 (shown dotted) may be placed in series between D1 and R4, and the bases 20, 23 and 24 may then be connected at various points in this series of Zener diodes.

Figure 3:
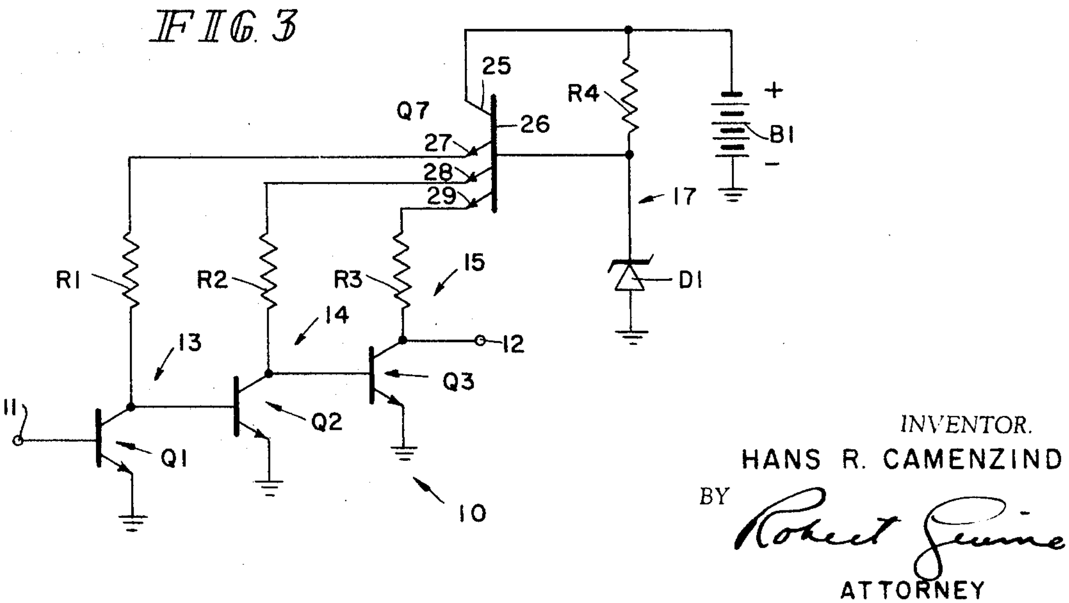
FIG. 3 is a diagram of a second form of the invention for use with the amplifiers of FIG. 1.

Since the collectors 19, 21 and 22 of FIG. 2 are all tied together, and since the bases 20, 23 and 24 are also connected to a common point, the transistors Q4, Q5 and Q6 may be replaced by a single transistor Q7 as is shown in FIG. 3. The transistor Q7 has a collector 25 connected to the battery B1, a base 26 tied to the source 17 of constant potential, and a plurality of emitters 27, 28 and 29 connected respectively to the stages 13, 14 and 15. The use of the multiple-emitter transistor Q7 instead of the separate transistors Q4, Q5 and Q6 saves valuable space on an integrated-circuit chip, and is also easier and less expensive to produce. Within practical limits of fabrication and device geometry, the transistor Q7 may have any number of emitters. If the number of points within the circuit 10 to be regulated and decoupled exceeds these limits, the points may of course be divided into groups, with one multiple-emitter transistor for each group.

The supply-voltage regulation and decoupling achieved by the present invention requires only a small number of components, all of which are easily fabricated by integrated-circuit techniques. Therefore, the invention adds but little to the size or expense of an integrated-circuit chip. In addition, the present decoupling and regulation means is greatly superior in terms of size and cost to conventional means. It will also be appreciated, of course, that the present invention may be used to supply a plurality of regulated and decoupled bias voltages within a single stage of a transistor circuit. Another aspect of the invention relates to the means and instrumentalities used therein, whether or not they are employed in the field primarily contemplated by the invention.

Having described my invention by way of illustration rather than limitation, I claim:

1. A multi-staged substantially integratable amplifier including a decoupling and regulation means compirsing:

a first, second and third amplifying transistor each having a collector, emitter and base, the base of the first of said amplifying transistors acting as an input terminal to said amplifier, the emitters of each of said amplifying transistors connected to ground, the collector of said first amplifying transistor being connected to the base of said second amplifying transistor, the collector of said second amplifying transistor being connected to the base of said third amplifying transistor, the collector of said third amplifying transistor acting as an output terminal, a respective resistive means connected in series with a respective regulation transistor between a respective collector of each of said amplifying transistors and a common junction, said common junction acting as a terminal means to which a power supply can be connected.

2. An amplifier according to claim 1 further including:

a resistor connected between the collector and base of said third respective regulation transistor, said regulation transistors having their bases connected together at a second common junction, and a first diode means connected between said second common junction and ground.

3. An amplifier according to claim 2 further including:

a second diode means connected between the bases of said first and second regulation transistors, and a third diode means connected between the bases of said second and third regulation transistors.

4. A multi-staged substantially integratable amplifier including a decoupling and regulation means comprising:

a first, second and third amplifying transistor each having a collector, emitter and base, the base of said first amplifying transistor acting as an input terminal, the emitters of each of said amplifying transistors being connected to ground, the collector of the first of said amplifying transistors being connected to the base of said second amplifying transistor, the collector of said second amplifying transistor being connected to the base of said third amplifying transistor, the collector of said third amplifying transistor acting as an output terminal for said amplifier, a multiple-emitter transistor, the collector of said multiple-emitter transistor adapted to be connected to a power supply, resistance means connected between the collector and base of said multiple-emitter transistor, diode means connected between the base of said multiple-emitter transistor and ground, and a respective resistor connected between the respective collectors of said amplifying transistors and a respective emitter of said multiple-emitter transistor.

References Cited

UNITED STATES PATENTS

| | | | |
|---|---|---|---|
| 2,486,155 | 10/1949 | Hadfield | 323—4 |
| 2,666,818 | 1/1954 | Shockley | 330—40 |
| 2,897,429 | 7/1959 | Jochems | 307—297 |
| 3,030,586 | 4/1962 | Paz et al. | 330—40 |
| 3,103,617 | 9/1963 | Schneider | 307—279 |
| 3,214,706 | 10/1965 | Mollinga | 330—40 |
| 3,250,922 | 5/1966 | Parham | 323—4 |
| 3,283,170 | 11/1966 | Buie | 307—299 |
| 3,351,865 | 11/1967 | Dow et al. | 330—18 |

DONALD D. FORRER, Primary Examiner

H. A. DIXON, Assistant Examiner

U.S. Cl. X.R.

307—270, 299; 330—19, 40